United States Patent
Cho et al.

(10) Patent No.: US 8,467,203 B2
(45) Date of Patent: Jun. 18, 2013

(54) APPARATUS FOR GENERATING HIGH-VOLTAGE AND METHOD THEREOF

(75) Inventors: Jun-seok Cho, Gwangmyeong-si (KR); Joong-gi Kwon, Gunpo-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 114 days.

(21) Appl. No.: 12/662,239

(22) Filed: Apr. 7, 2010

(65) Prior Publication Data

US 2010/0194363 A1 Aug. 5, 2010

Related U.S. Application Data

(62) Division of application No. 11/342,622, filed on Jan. 31, 2006, now Pat. No. 7,791,907.

(30) Foreign Application Priority Data

May 23, 2005 (KR) ................................. 2005-43126

(51) Int. Cl.
*H02M 3/335* (2006.01)

(52) U.S. Cl.
USPC .......................... 363/21.13; 713/320; 323/283

(58) Field of Classification Search
USPC .................... 323/282, 283; 363/21.01, 21.05, 363/21.13, 21.04, 21.07, 21.1, 21.11, 21.12, 363/21.15, 21.17, 21.18; 713/300, 320
See application file for complete search history.

(56) References Cited

U.S. PATENT DOCUMENTS

| 4,095,165 | A | 6/1978 | Boros |
|---|---|---|---|
| 4,210,858 | A | 7/1980 | Ford et al. |
| 4,484,812 | A | 11/1984 | Takayanagi |
| 5,349,523 | A * | 9/1994 | Inou et al. ........................ 363/97 |
| 5,369,472 | A | 11/1994 | Raj et al. |
| 6,005,377 | A | 12/1999 | Chen et al. |
| 7,092,265 | B2 | 8/2006 | Kernahan |
| 7,380,146 | B2 | 5/2008 | Swope |
| 7,412,612 | B2 | 8/2008 | Maple et al. |
| 2004/0046535 | A1 * | 3/2004 | Duffy et al. ................... 323/283 |
| 2004/0097914 | A1 | 5/2004 | Pantera et al. |
| 2005/0111242 | A1 * | 5/2005 | Oh ............................ 363/21.07 |

FOREIGN PATENT DOCUMENTS

| JP | 63-113472 | 5/1988 |
|---|---|---|
| JP | 07-241083 | 9/1995 |
| JP | 2003-033021 | 1/2003 |
| JP | 2004-037635 | 2/2004 |

* cited by examiner

*Primary Examiner* — Nguyen Tran
(74) *Attorney, Agent, or Firm* — Roylance, Abrams, Berdo & Goodman, LLP (57) ABSTRACT

Provided are a high voltage generating apparatus controlled by a digital control code and a method thereof. The high voltage generating apparatus includes a switching unit for controlling a voltage induced at the secondary coil of a power transformer by an interrupt operation, wherein the interrupt operation interrupts the current flowing through the primary coil of the connected power transformer. A digital controller for controlling the interrupt operation of the switching unit according to the control data. A digital interface for providing the control data to the digital controller is provided. The control data is extracted from the control code transferred using one of a plurality of predetermined communication protocols. The switching unit, digital interface, and digital controller can be implemented in one ASIC (application-specific integrated circuit) chip.

5 Claims, 9 Drawing Sheets

APPARATUS FOR GENERATING HIGH-VOLTAGE AND METHOD THEREOF

CROSS-REFERENCE TO RELATED APPLICATIONS

This application is a divisional application of U.S. patent application Ser. No. 11/342,622, filed Jan. 31, 2006, now U.S. Pat. No. 7,791,907, which in turn claims the benefit under 35 U.S.C. §119(a) from Korean Patent Application No. 2005-43126, filed May 23, 2005, in the Korean Intellectual Property Office, the entire disclosure of both of said prior applications being hereby incorporated by reference.

BACKGROUND OF THE INVENTION

1. Field of the Invention

The present invention relates to a high voltage generating apparatus and a method thereof. More specifically, the present invention relates to a high voltage generating apparatus implemented in an ASIC (application-specific integrated circuit) and a method thereof, in which the output voltage can be controlled using a digital control code.

2. Description of the Related Art

An image forming apparatus is an apparatus for printing on a recording medium, such as printing paper, an image that corresponds to inputted original image data. Examples of image forming apparatuses include printers, copy machines, laser printers, LED print head (LPH) printers and facsimile machines. In such image forming apparatuses, an electro-photographic method as been adopted. An electro-photographic image forming apparatus performs printing operations through the processes of charging, exposing, developing, transferring, fixing, and the like.

Figure 1:
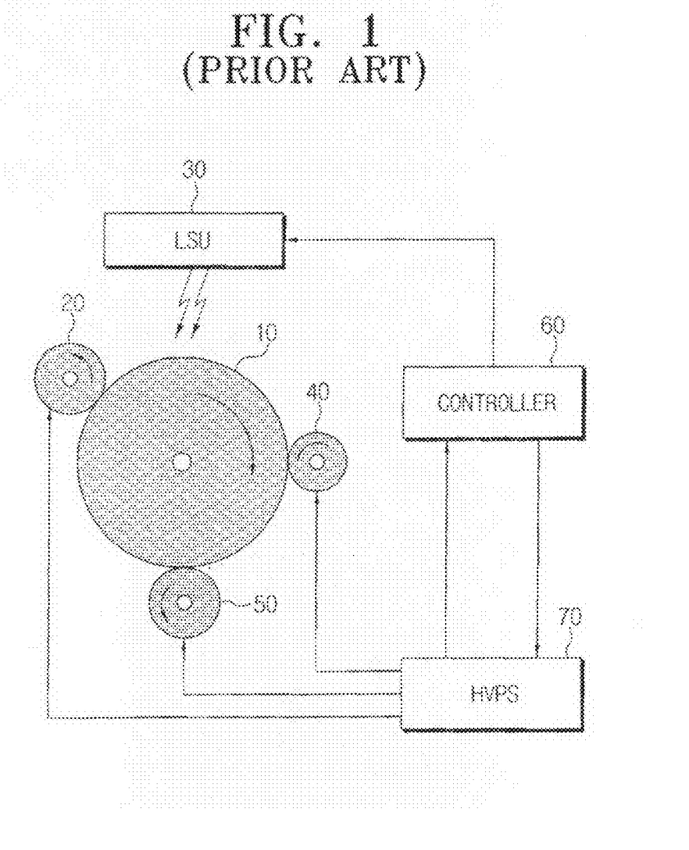
FIG. 1 is a cross-sectional view schematically showing a conventional image forming apparatus.

FIG. 1 is a cross-sectional view schematically showing a conventional electro-photographic image forming apparatus. Referring to FIG. 1, an electro-photographic image forming apparatus includes a photosensitive drum 10, charging roller 20, laser scanning unit (LSU) 30, developing roller 40, transferring roller 50, controller 60, and high voltage generating apparatus (HVPS) 70.

The operations of an electro-photographic image forming apparatus are now explained. First, under control of the controller 60, the high voltage generating apparatus 70 applies a predetermined voltage to the charging roller 20, developing roller 40, and transferring roller 50. The charging roller 20 evenly charges the surface of the photosensitive drum 10 with the charging voltage applied from the high voltage generating apparatus 70. Then, the LSU 30 scans light corresponds to the image data received from the controller 60 onto the photosensitive drum 10. Accordingly, an electrostatic latent image is formed on the surface of the photosensitive drum 10. Then, a toner image is formed on the electrostatic latent image by the toner supplied from the developing roller 40. The transferring roller 50 is driven by the transferring voltage applied from the high voltage generating apparatus 70. The transferring roller 50 transfers the toner image formed on the photosensitive drum 10 to the printing paper. Then, the toner image transferred on the printing paper is fixed on the printing paper by high temperature and pressure from a fixer (not shown). Finally, the printing paper is ejected in an ejecting direction (not shown), thereby completing a printing operation.

As described above, the high voltage generating apparatus 70 is a core element of a printer, copy machine, laser printer, LED print head (LPH) printer, facsimile machine and the like. The high voltage generating apparatus 70 is a device that instantly converts a low voltage of about 12~24 V into a high voltage of hundreds~thousands volts. The high voltage is applied to a roller of an electro-photographic image forming apparatus. The high voltage generating apparatus 70 is used as either a constant voltage or a constant current source.

Figure 2:
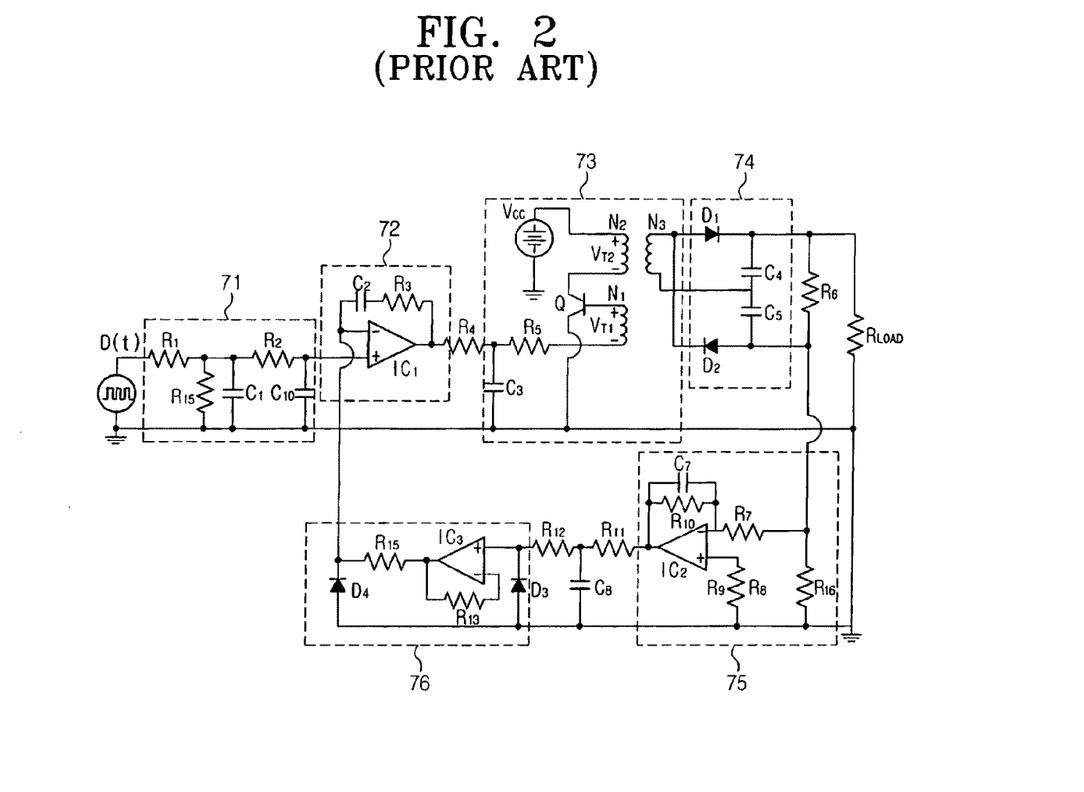
FIG. 2 is a circuit diagram showing an example of a conventional high voltage generating apparatus.

FIG. 2 is a circuit diagram showing an example of a conventional high voltage generating apparatus. Referring to FIG. 2, a conventional high voltage generating apparatus comprises a low-pass filter 71, voltage controller 72, oscillator and power transformer 73, voltage distributor 74, voltage sensor 75, and a protection circuit 76. The low-pass filter 71 receives a pulse width modulation (PWM) signal D(t) from a print controller or the like. The low-pass filter 71 outputs a direct current (DC) voltage signal that is determined according to a duty ratio of PWM signal D(t). In doing so, the low-pass filter 71 converts the received PWM signal into a DC signal using a RC two-step filter. The outputted DC signal is used as a reference signal by voltage controller 72.

Voltage controller 72 operates as a differential circuit by comparing the DC signal outputted from the low-pass filter 71 and the feedback signal of high voltage generating apparatus's actual output voltage. Further, voltage controller 72 operates as a controller by generating a drive signal, based on the comparison, for controlling the amount of base current for transistor Q of the oscillator and power transformer 73. According to the voltage change between both ends of the transistor's emitter and collector, the voltage of the voltage transformer's primary coil is changed and likewise the voltage at the voltage transformer's secondary coil, having a higher turn ratio, is changed.

The voltage distributor 74 uses rectifying diodes D1 and D2, and voltage distributing and smoothing capacitors C4 and C5. Further, voltage distributor 74 generates the high voltage generating apparatus's DC output voltage from the alternating current (AC) voltage induced at the secondary coil of the power transformer. The voltage sensor 75 and the protection circuit 76 detect the actual output voltage and create a feedback signal for the voltage controller 72, and thus prevent an abnormal voltage from being applied.

FIG. 2 is the circuit diagram of a high voltage generating apparatus for generating a high voltage for one specific channel, such as the developing roller. A separate channel is respectively needed in order to apply similar high voltages to the charging roller 20, developing roller 40, and transferring roller 50.

The above exemplary conventional high voltage generating apparatus has a number of drawbacks. For instance, since it uses an analog control method to control the output of each channel independently, errors due to variances in the characteristics of the components that make up the RC filter or voltage controller must be compensated. In order to compensate, a plurality of elements are required thus making it is difficult to reduce the unit cost. A further drawback is that the poor quality of components, due to external factors, may cause the whole apparatus to malfunction. Moreover, another drawback is that the transistor used as a switching element in the oscillator and power transformer always operates in a linear area, thus the transistor always has an exothermic characteristic. Furthermore, as shown in FIG. 2, the conventional high voltage generating apparatus uses a plurality of elements which increases the number of man-hours required in the assembly process. Also, since there are many components, sufficient space needs to be allocated on the printed circuit board (PCB) for the numerous components. Lastly, since the elements are connected in a fixed manner, the output voltage cannot be easily controlled to vary.

Accordingly, there is a need for an improved high voltage generating apparatus that reduces the amount components required and is controllable such that its operation can be varied

SUMMARY OF THE INVENTION

An aspect of the present invention is to address at least the above problems and/or disadvantages and to provide at least the advantages described below. Accordingly, an aspect of the present invention is to provide a high voltage generating apparatus and a method thereof, in which control functions can be implemented in an ASIC chip by using a digital control method, and output voltage can be controlled by a digital control code.

According to one aspect of an exemplary embodiment of the present invention, there is provided a high voltage generating apparatus comprising a switching unit for controlling a voltage induced at the secondary coil of a connected power transformer by an interrupt operation, wherein the interrupt operation interrupts the current flowing through the primary coil of the connected power transformer, a digital controller for controlling the interrupt operation of the switching unit according to the control data, and a digital interface for providing the control data to the digital controller, the control data being extracted from the control code transferred using one of a plurality of predetermined certain communication protocols.

In an exemplary implementation, the digital interface includes an I2C interface for extracting the control data from the control code transferred using an I2C communication protocol and outputting the control data, the I2C communication protocol being a first one of the plurality of predetermined communication protocols; an SPI unit for extracting from the control code transferred using an SPI (Serial Peripheral Interface) communication protocol and outputting the control data, the SPI communication protocol being a second one of the plurality of predetermined communication protocols; a memory for storing and outputting the control data outputted from either the I2C interface or the SPI unit; and a demultiplexer for transferring the control code as an input to either the I2C interface or the SPI unit.

In another exemplary implementation, addition, the memory preferably includes a volatile memory for storing a the control data, and a programmable non-volatile memory having the same memory map as that of the volatile memory. Then, the switching unit, digital interface, and digital controller can be implemented in one-chip.

The control data may comprise data for determining any one of the waveform of the output voltage, the magnitude of the output voltage, and whether or not the output voltage is being outputted.

According to an exemplary implementation the digital controller receives a feedback signal corresponding to an output voltage of the secondary coil power transformer, wherein a period of the interrupt operation of the switching unit is adjusted according to the result of a comparison between the feedback signal and the control data. The switching unit can comprise a MOSFET as a switching element for the interrupt operation.

Such a high voltage generating apparatus can be used for an image forming apparatus.

On the other hand, according to another aspect of an exemplary embodiment of the invention, there is provided a method of generating high voltage. The method comprises extracting control data from a control code transferred using one of a plurality of predetermined communication protocols, controlling the switching operation of a switching element according to the control data, and controlling a voltage induced at the secondary coil of a power transformer by an interrupt operation, wherein the interrupt operation interrupts the current flowing through the primary coil of the connected power transformer according to the switching operation. The method may further comprises receiving a feedback signal corresponding to an output voltage of the secondary coil, wherein a period of the interrupt operation of the switching unit is adjusted according to the result of a comparison between the feedback signal and the control data. In an exemplary implementation, at least some of the method steps described above addition, the steps can be executed in one-chip. Such a method of generating high voltage can be used for an image forming apparatus.

According to another aspect of an exemplary embodiment of the invention, there is provided an ASIC chip implemented on a single semi-conductor substrate. The ASIC chip comprises a switching unit for controlling a voltage induced at the secondary coil of a power transformer by an interrupt operation, wherein the interrupt operation interrupts the current flowing through the primary coil of the connected power transformer, a digital controller for controlling the interrupt operation of the switching unit according to the control data, and a digital interface for providing the control data to the digital controller, the control data being extracted from the control code transferred using one of a predetermined communication protocols.

According to an exemplary implementation, the ASIC chip further comprises a feedback circuit for receiving a feedback signal corresponding to an output voltage of the secondary coil, wherein a period of the interrupt operation of the switching unit is adjusted according to the result of the comparison between the feedback signal and the control data.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In a high voltage generating apparatus according to exemplary embodiments of the invention, the control function that interrupts the primary coil of a power transformer is formed in a digitally controlled ASIC chip. In addition, exemplary embodiments of the invention will be described, illustrating an ASIC chip that can drive four channels.

Figure 3:
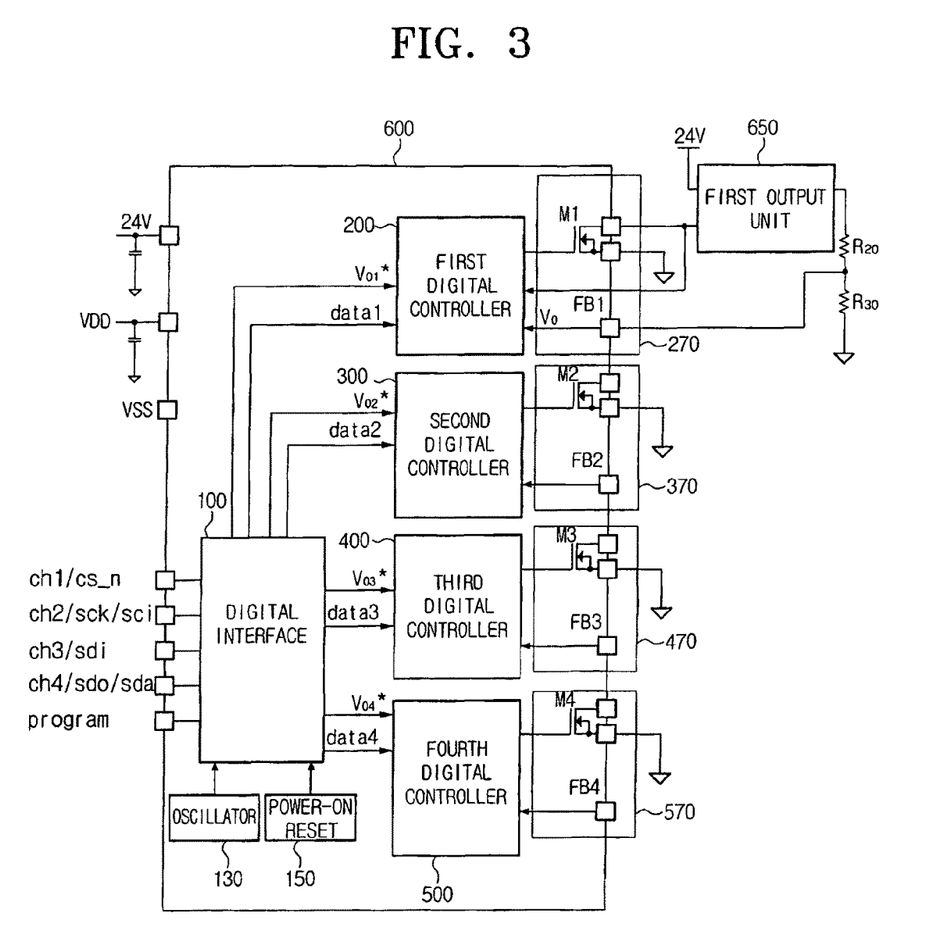
FIG. 3 is a block diagram showing a high voltage generating apparatus according to an exemplary embodiment of the invention.

FIG. 3 is a block diagram showing the high voltage generating apparatus according to an embodiment of the invention. Referring to FIG. 3, the high voltage generating apparatus comprises a digital interface 100, oscillator 130, power-on reset unit 150, first to fourth digital controller 200, 300, 400, 500, and first to fourth switching unit 270, 370, 470, 570, which are embedded in one ASIC chip. Each of the first to fourth switching units 270, 370, 470, 570 is respectively connected to an output unit including a power transformer and a power distribution circuit. For the sake of convenience, only the first switching unit 270 is shown connected to the first output unit 650 in FIG. 3.

The digital interface 100 receives a control code, including control data, from a main controller such as a print engine controller, through a predetermined protocol. The control data is used to control the waveform or magnitude of the output voltage. SPI (Serial Peripheral Interface) and/or I2C (bi-directional serial bus) may be used as the communication protocol to convey the control data from the main controller to the digital interface 100. SPI is an interface allowing data to be exchanged between two devices in a serial communication. Similarly, I2C is a serial communication interface allowing data to be exchanged between two devices in a serial communication.

The digital interface 100 extracts control data from the control code received from the main controller, transfers the extracted control data to each of the first to fourth digital controllers 200, 300, 400, 500 in order to use the data as time constants data1, data2, data3, data4 that control the waveform of the output voltage, and as control reference values $V_{01}^*$, $V_{02}^*$, $V_{03}^*$, $V_{04}^*$ that control the magnitude of the output voltage.

The configurations and functions of the first to fourth digital controllers 200, 300, 400, 500 are the same. The control reference value $V_{01}^*$, $V_{02}^*$, $V_{03}^*$, $V_{04}^*$ is compared with the feedback signal $V_0$ that is the detected actual output voltage of each channel, and according to the result of the comparison, the drive signal of the corresponding switching element in the first to fourth switching units 270, 370, 470, 570 is controlled. Feedback signal $V_0$ is inputted to the ASIC chip through the FB1 terminal from a voltage divided output of the first output unit 650. The voltage divider is arranged such that a first end of resistor $R_{20}$ is connected to the output of the first output unit 650 and the second end of resistor $R_{20}$ is connected to terminal FB1 and a first end of resistor $R_{30}$ with the second end of resistor $R_{30}$ being connected to ground. Despite feedback signal $V_0$ being described for the first switching unit, switching units two through four comprise similar arrangements with $V_0$ being inputted via FB2, FB3 and FB4 for each channel.

The first to fourth switching units 270, 370, 470, 570 are also embedded in the ASIC chip, and MOSFETs M1, M2, M3, M4 are used as switching elements. Each of the first to fourth switching units 270, 370, 470, 570 are configured so as to be on/off in accordance with the drive signal that is outputted from each of the first to fourth digital controllers 200, 300, 400, 500. The drive signal is applied to the gate of the MOSFETs, thereby controlling the voltage flowing through the primary coil of the power transformer that is serially connected to the drain. In this way, a MOSFET is used as a switching element instead of a transistor, so that a conventional heat sink for dissipating heat generated at the transistor becomes unnecessary.

Figure 8:
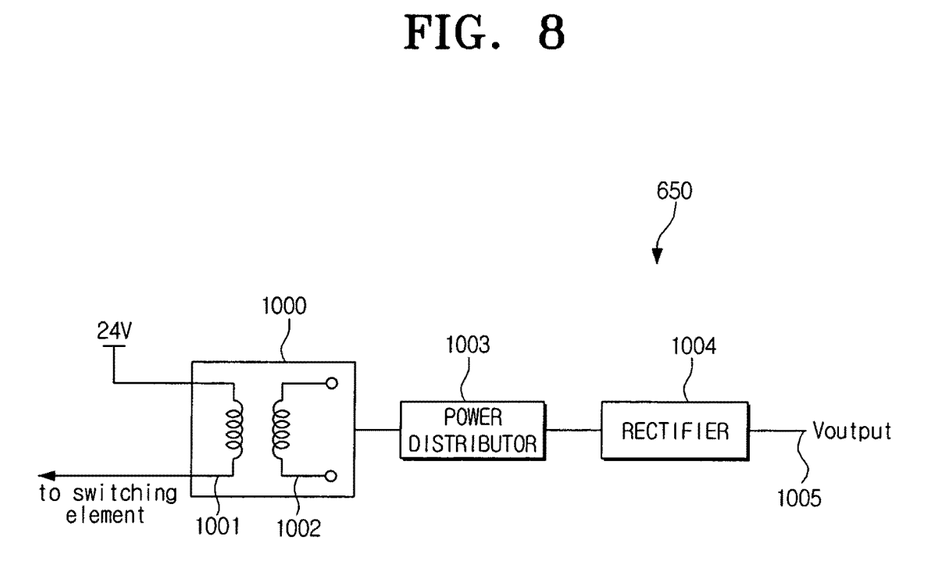
FIG. 8 is a block diagram illustrating the First output unit 650 in accordance with one embodiment of the present invention.

Referring to FIG. 8, the first output unit 650 includes a power transformer 1000, power distributor 1003, and rectifier 1004. The power transformer 1000, serially connected to the switching element, is configured to serially resonate in accordance with the on/off operation of the switching element. In operation, the power transformer 1000 generates alternating current signals, thereby inducing an AC voltage having high electrical potentials at the secondary coil 1002 of the power transformer. The power distributor 1003 and the rectifier 1004 are configured so as to simply rectify and use the AC voltage induced at the secondary coil of the power transformer according to the range of the output voltage, or to pass the AC voltage through a distribution circuit, boost the voltage, and use as the final voltage. The high voltage generating apparatus 600 comprises an oscillator 130 that is a clock generator, a power-on reset unit 150 for supplying a reset signal while power is supplied, a 24 V power supply for supplying the high voltage, a VDD that is a power supply for driving the ASIC chip, and a VSS that the ground for the ASIC chip.

In operation, in the configuration described above the output unit of each channel is controlled according to the control data transferred from the engine controller so as to generate a high voltage.

Figure 4:
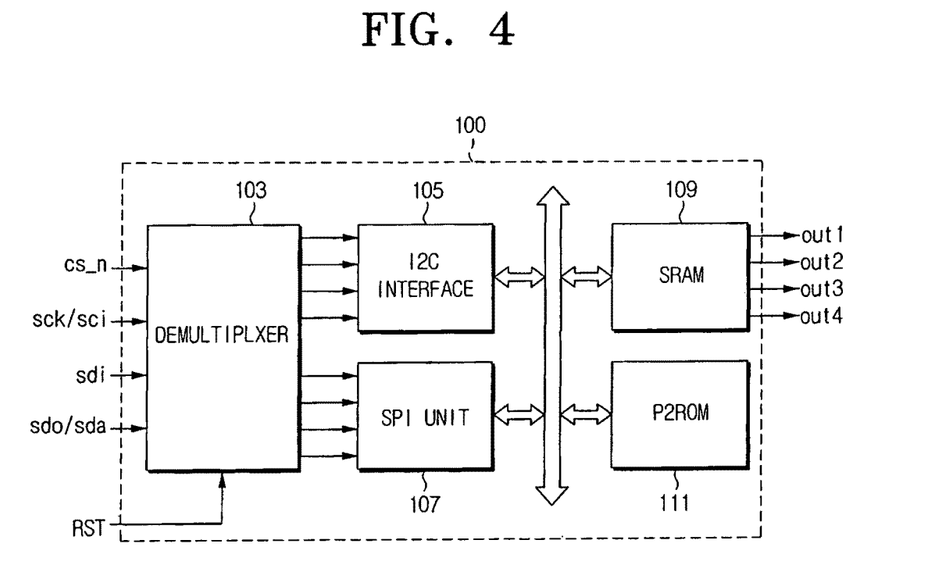
FIG. 4 is a detailed block diagram showing the digital interface of FIG. 3.

FIG. 4 is a detailed block diagram showing the digital interface 100 of FIG. 3. Referring to FIG. 4, the digital interface 100 includes a demultiplexer 103, I2C interface 105, SPI unit 107, SRAM 109, and P2ROM (Production-Programmed Read-Only Memory) 111.

According to the signal inputted into an 'RST' terminal, the demultiplexer 103 connects the signals received through the 'cs_n', 'sck/sci', 'sdi', and 'sdo/sda' terminals as the input signals of either the I2C interface 105 or the SPI unit 107. For example, if a logic low signal is inputted into the 'RST' terminal, the demultiplexer is switched so that the signals inputted through the 'cs_n', 'sck/sci', 'sdi', and 'sdo/sda' terminals become the inputs of the I2C interface 105, and if a logic high signal is inputted into the 'RST' terminal, the demultiplexer is switched so that the signals inputted through the 'cs_n', 'sck/sci', 'sdi', and 'sdo/sda' terminals become the inputs of the SPI unit 107. The 'RST' terminal is a control signal input for switching the communication interface type.

The I2C interface 105 receives a control code from the main controller according to the I2C communication interface method. The SPI unit 107 receives a control code from the main controller according to the SPI communication interface method. The control data outputted from either the I2C interface 105 or the SPI unit 107 is stored in the SRAM 109, and is used to set the time constant of an output voltage compensator (not shown) inside the first digital controller 200.

As shown in FIG. 4, the digital interface 100 uses the serial communication interface circuit that is configured to send and receive digital data between the main controller and the high voltage generating apparatus, and either SPI or I2C is applied as the serial communication interface. As needed, the SPI or the I2C function can be selectively used according to 'RST' signal received at the 'RST' terminal so that either SPI or I2C serial communications can be selectively used. In the exemplary embodiment of the invention either SPI or I2C serial communications are used, however any other type of communications interface may also be used.

In addition, in order to permanently store the control data, such as the time constant of the output voltage compensator, the P2ROM 111 is configured as a fuse array having the same memory mapping as the SRAM 109. P2ROM 111 permanently stores the control data, such as the time constant that has completed the time constant tuning operation of the output voltage compensator, and the like. In this way, if either the SPI or I2C interface is applied, the SPI or I2C operations can be performed through the limited set of input/output terminals. Further, this allows for the ASIC to be miniaturized.

Table 1 shows a register map allocated in SRAM 109.

As shown in Table 1, the register map is configured by applying a separate register memory that stores various control data used to control the high voltage generating apparatus. The register map has control data shown below for each channel CH#.

NV: is a control value for setting the feedback signal polarity of the output voltage controller.

URM: is a control value for performing open loop control of the selected channel.

OV: is a reference value of the high output voltage.

PC: is a proportional gain value of the output voltage controller.

IC: is an integrated gain value of the output voltage controller.

ADC: is an A/D converted value of the output voltage used for controlling the voltage by a main CPU in order to directly monitor the output voltage state of the HVPS.

RN_CH#: is a control value for turning on/off the output voltage by channel number.

Channel Access: is a command for a CPU to scan all of the parameters stored in the register map.

Table 2 shows a configuration of fundamental control codes transferred between the main controller and the high

TABLE 1

| RA<5:0> | MSB | D6 | D5 | D4 | D3 | D2 | D1 | LSB |
|---|---|---|---|---|---|---|---|---|
| CH# + "000" | '0' | NV | URM | '0' | OV<11> | OV<10> | OV<9> | OV<8> |
| CH# + "001" | OV<7> | OV<6> | OV<5> | OV<4> | OV<3> | OV<2> | OV<1> | OV<0> |
| CH# + "010" | PC<7> | PC<6> | PC<5> | PC<4> | PC<3> | PC<2> | PC<1> | PC<0> |
| CH# + "011" | IC<7> | IC<6> | IC<5> | IC<4> | IC<3> | IC<2> | IC<1> | IC<0> |
| CH# + "100" | ADC<7> | ADC<6> | ADC<5> | ADC<4> | ADC<3> | ADC<2> | ADC<1> | ADC<0> |
| CH# + "101" | | | | Test register | | | | |
| CH# + "110" | '0' | '0' | '0' | '0' | RNCH2 | RNCH2 | RNCH2 | RNCH2 |
| CH# + "111" | | | | Channel access operation | | | | |

The CH# in the RA<5:0> of Table 1 is used to select channels shown below.

voltage generating apparatus through a serial communication.

TABLE 2

| BYTE | MSB | D6 | D6 | D6 | D6 | D6 | D6 | LSB |
|---|---|---|---|---|---|---|---|---|
| COMMAND | X | RD/WR | RA<5> | RA<4> | RA<3> | RA<2> | RA<1> | RA<0> |
| RD_WR | RD<7> | RD<6> | RD<5> | RD<4> | RD<3> | RD<2> | RD<1> | RD<0> |
| ACKNOWLEDGE | 0 | 0 | 1 | 0 | 0 | 0 | 0 | 0 |
| RD_READ | RD<7> | RD<6> | RD<5> | RD<4> | RD<3> | RD<2> | RD<1> | RD<0> |

CH#+"000" select channel 0
CH#+"001" select channel 1
CH#+"010" select channel 2
CH#+"011" select channel 3
CH#+"100" select channel 4
CH#+"101" select channel 5
CH#+"110" select channel 6
CH#+"111" select channel 7

The control code is fundamentally formed with a Command Code for setting the initiation of a command, a Data Code, such as 'RD_WR' and 'RD_READ', containing data, and an Ack Code (acknowledgement code) that transfers the termination of a communication.

Command Code: contains RD/WR and address (Addr) bits, and is used when setting the address of the register map and performing commands for reading or storing data. That is, if RD/WR='0', the data in the main controller is stored in the high voltage generating apparatus, and if RD/WR='1', the data in the high voltage generating apparatus is read and transferred to the main controller. The address bits denote the RA<5:0> register address.

Data Code: is data to be stored (RD_WR) in or read (RD_READ) from the register map.

Ack Code: transfers the termination of a communication.

The procedures of transmitting and receiving data between the main controller and the high voltage generating apparatus start with transmitting a data command from the main controller to the high voltage generating apparatus. In the case of the SPI mode, the command is the first byte transferred after the falling edge of 'cs_n' is a command, and in the case of I2C, the command is the first byte after the I2C address. According to the transferred command type, the high voltage generating apparatus receives data or transmits the requested data. In the case where the controller needs to transmit a new command, a new command can be transmitted after a signal to the 'cs_n' terminal is set to a logic high and then back to a logic low.

Figure 5A:
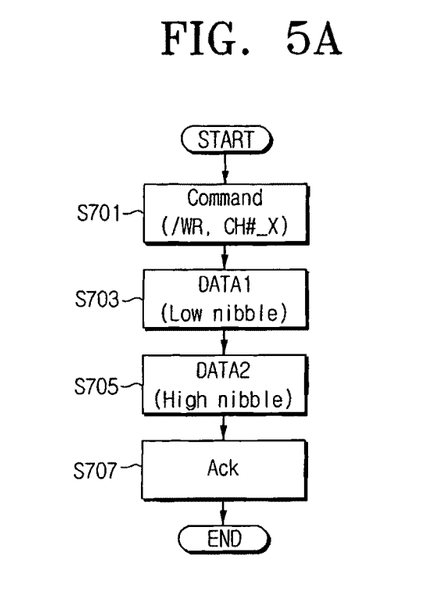
FIGS. 5A to 5C are flowcharts explaining the procedures transferring a control code used to control the high voltage generating apparatus according to an exemplary embodiment of the invention.
Figure 5B:
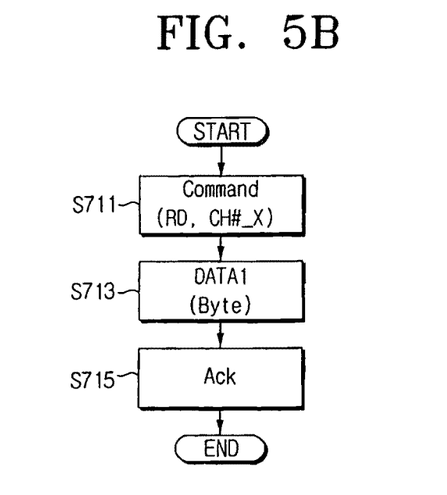
Figure 5C:
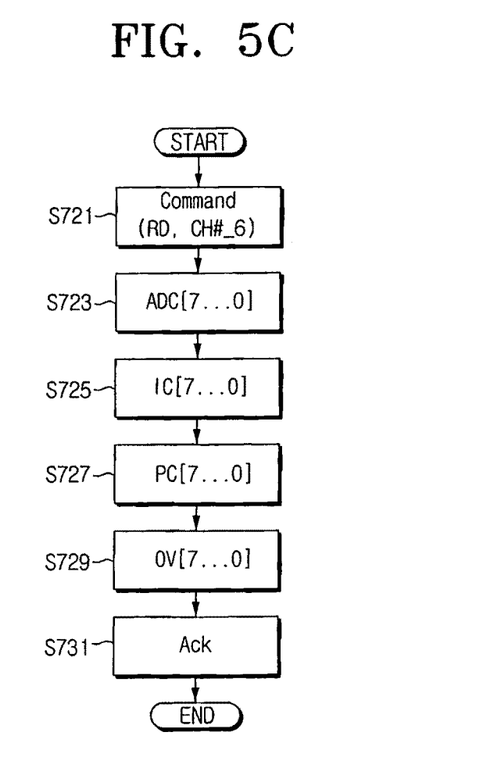

FIGS. 5A to 5C are flowcharts explaining the procedures of transferring a control code used to control the high voltage generating apparatus according to an embodiment of the invention. FIGS. 5A to 5C respectively show the procedures of a 'Write Mode' for storing control data in the high voltage generating apparatus, a 'Read Mode' for reading the control data stored in the high voltage generating apparatus, and a 'Scan Mode' for reading all the data stored in the high voltage generating apparatus.

FIG. 5A shows the operation of the 'Write Mode'. In this case, the communication interface operates such that the channel for which the data is to be stored in the register map is sent using a 'Command Code' S701, and the actual data is stored by applying the 'Data Code' S703 and S705. Once the data is stored, the 'Pick Code' is sent in order to complete the communication S707. Through these operations, one byte of data is stored. In order to store data for other channels, the procedures of the 'Write Mode' operation is repeated, but with a different channel address being sent in the 'Command Code'.

FIG. 5B shows the operation of the 'Read Mode'. In this case, the communication interface operates such that the address of the parameter to be read is sent using a 'Command Code' in a similar way as the 'Write Mode' S711, and actual data is read applying the 'Data Code' S713. In the same way as before, the operation is completed by the 'Ack Code' S715. Specifically, since the main controller monitors actual output voltage, the main controller can finely adjust and tune the ADC, that is the feedback value of the output voltage while operating, when the output voltage value is changed due to external factors.

FIG. 5C shows the operation of the 'Scan Mode'. This is an extended function of the 'Read Mode', which is used by the main controller in order to periodically scan all the control data of the high voltage generating apparatus, and monitor the register map state. In the same way as before, the operation is started by the 'Command Code' S721. The control data explained in Table 1, such as ADC[7 . . . 0], IC[7 . . . 0], PC[7 . . . 0], and OV[7 . . . 0], is sequentially read from the high voltage generating apparatus S723, S725, S727, S729, and transferred to the main controller. In the same way as before, the operation is completed by the 'Ack Code' S731.

Figure 6:
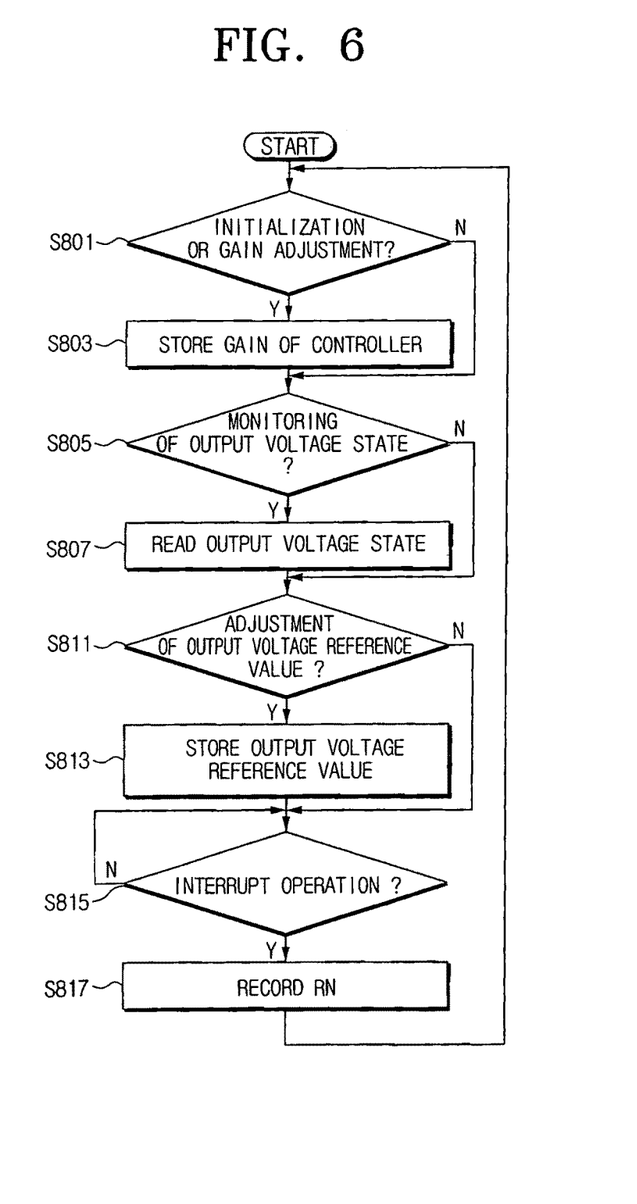
FIG. 6 is a flowchart explaining an example of programming procedures of a main controller for controlling the high voltage generating apparatus according to an exemplary embodiment of the invention.
Figure 7:
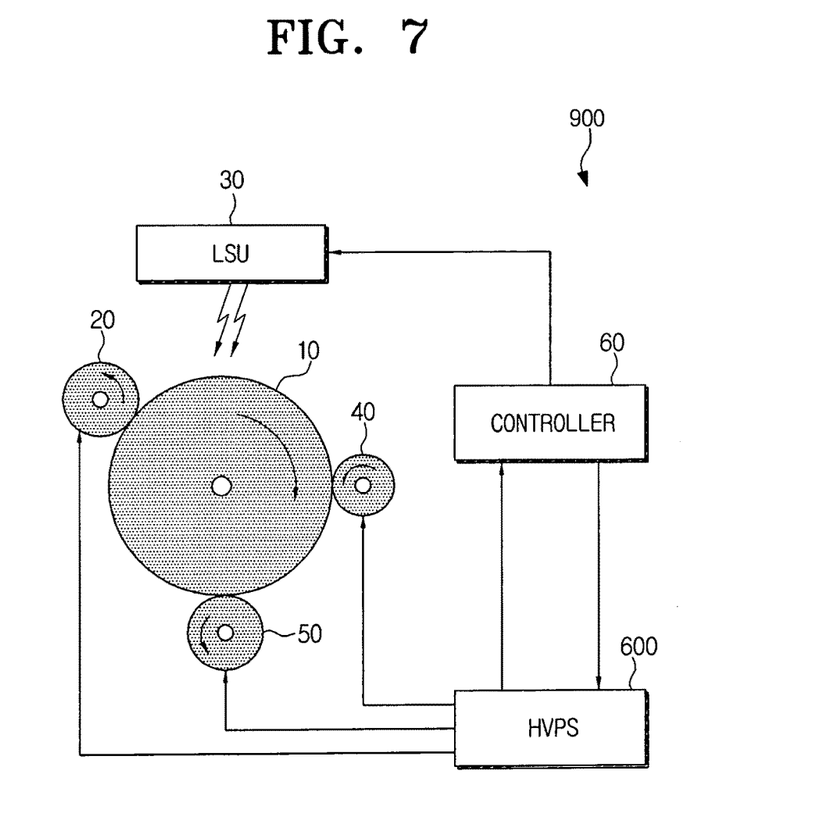
FIG. 7 is a cross-sectional view schematically showing an image forming apparatus using the novel high voltage generating apparatus described in this application.

FIG. 6 is a flowchart explaining an example of the programming procedure of a main controller for controlling a high voltage generating apparatus according to an embodiment of the invention. Referring to FIG. 6, the main controller stores the gain of the controller (PC/IC) S801, S803 when initializing or adjusting a gain. The main controller then reads an output voltage state when the output voltage state is being monitored S805, S807. In addition, when the controller desires to adjust the reference value of the output voltage, the controller stores the reference value of the output voltage S811, S813. The main controller then controls the 'on/off' of the output voltage via an interrupt operation and records the RN if the interrupt operation is initiated S815, S817. Specifically, the programming procedure of the controller provides a function that can sense the output voltage, and change the gain of the controller or the reference value of the output voltage.

Numerous advantages may be gained by implementing the exemplary embodiments of the invention. For example, the control functions performed by the RC filter and an OP amplifier of a conventional high voltage generating apparatus are implemented in a digital controller that is embedded in an ASIC chip. This allows for changes in the load that is connected to the output to be actively coped with. Moreover, the overall configuration can be simplified by embedding the switching elements of the conventional high voltage generating apparatus into the ASIC. In addition, parameter values can be easily modified through communications when adjusting the time constant of the voltage controller, so that an adjustment operation can be effectively performed without having to change any ASIC elements.

Also, the outputs of four or more channels can be controlled using one ASIC chip, and if more channels are needed it can be accomplished using a plurality of ASIC chips.

As shown above, according to an embodiment of the invention, an one-chip ASIC is implemented so as to control the output voltage using a digital control code, thereby reducing the number of elements and miniaturizing the apparatus. Control data for setting a time constant and the like can be received using diverse communication interface methods, such as the SPI or I2C methods, thereby expanding its usefulness.

Also, the values of the control variables, such as a proportional gain, used by the digital controller in an ASIC chip can be adjusted via software. Adjusting the control values via software enhances flexibility by optimally controlling according to the output state. In addition, the time taken to adjust each parameter in a conventional analog control method is saved, thus efficiency in a mass production is increased. Furthermore, since the MOSFETs used as a switching element are embedded in the ASIC chip, their exothermic characteristics are improved.

While the invention has been shown and described with reference to certain exemplary embodiments thereof, it will be understood by those skilled in the art that various changes in form and details may be made therein without departing from the spirit and scope of the invention as defined by the appended claim.

What is claimed is:

1. A method of generating a high voltage induced at a secondary coil of a power transformer, the method comprising the steps of:
   (a) extracting control data configured to control the induced high voltage from a control code transferred to a controller via at least one communication protocol, the control data including at least one reference value corresponding to a target voltage;
   (b) controlling a switching operation of a switching element according to the control data by monitoring a voltage corresponding to the induced high voltage, and adjusting the switching operation based on the control data and the monitored voltage; and (c) controlling the induced high voltage by an interrupt operation so that the induced high voltage is continually adjusted towards the target voltage, wherein the interrupt operation comprises interrupting current flowing through a primary coil of the power transformer according to the switching operation, wherein the control code comprises at least one of a command code for setting a performance of a command and a data code containing data.

2. The method as claimed in claim 1, further comprising a step of:

(d) receiving a feedback signal corresponding to an output voltage of the secondary coil, wherein a period of the interrupt operation of the switching unit is adjusted according to a result of a comparison between the feedback signal and the control data.

3. The method as claimed in claim 2, wherein the steps (a) to (d) are executed in a single chip.

4. The method as claimed in claim 2, wherein the switching element comprises a MOSFET.

5. An image forming apparatus generating voltage using the steps as claimed in claim 2.

* * * * *